United States Patent
Ebergen et al.

(10) Patent No.: US 10,423,389 B2
(45) Date of Patent: Sep. 24, 2019

(54) METHODS FOR CONSTRUCTING LOOKUP TABLES FOR DIVISION AND SQUARE-ROOT IMPLEMENTATIONS

(71) Applicant: Oracle International Corporation, Redwood City, CA (US)

(72) Inventors: Josephus Ebergen, San Francisco, CA (US); Dmitry Nadezhin, Moscow (RU); Christopher Olson, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 17 days.

(21) Appl. No.: 15/122,771

(22) PCT Filed: May 13, 2016

(86) PCT No.: PCT/RU2016/000302
§ 371 (c)(1),
(2) Date: Aug. 31, 2016

(87) PCT Pub. No.: WO2017/196204
PCT Pub. Date: Nov. 16, 2017

(65) Prior Publication Data
US 2018/0018146 A1    Jan. 18, 2018

(51) Int. Cl.
*G06F 7/523* (2006.01)
*G06F 7/544* (2006.01)
(Continued)

(52) U.S. Cl.
CPC ............... *G06F 7/523* (2013.01); *G06F 1/03* (2013.01); *G06F 7/535* (2013.01); *G06F 7/544* (2013.01);
(Continued)

(58) Field of Classification Search
CPC ...... G06F 7/4873; G06F 7/552; G06F 7/5525; F06F 1/03
(Continued)

(56) References Cited

U.S. PATENT DOCUMENTS 4,482,975 A    11/1984  King
4,707,798 A *  11/1987  Nakano ................. G06F 1/0356
                                          708/654
(Continued)

OTHER PUBLICATIONS

David L. Rager, et. al., Formal Verification of Division and Square Root Implementations, an Oracle Report, ieeexplore.ieee.org/document/7886673/, Oct. 2016.*
(Continued)

*Primary Examiner* — Andrew Caldwell
*Assistant Examiner* — Emily E Larocque
(74) *Attorney, Agent, or Firm* — Meyertons, Hood, Kivlin, Kowert & Goetzel, P.C.; Erik A. Heter

(57) ABSTRACT

Control circuitry coupled to a multiply unit which includes a plurality of stage, each of which may be configured to perform a corresponding arithmetic function, may be configured to retrieve a given entry from a lookup table dependent upon a first portion of a binary representation of an input operand. An error value of an error function evaluated dependent upon a lookup value in a given entry of the plurality of entries is included in a predetermined error range. The control circuitry may be further configured to determine an initial approximation of a result of an iterative arithmetic operation using the first entry and initiate the iterative arithmetic operation using the initial approximation and the input operand.

13 Claims, 12 Drawing Sheets

(51) Int. Cl.
  *G06F 1/03*   (2006.01)
  *G06F 17/17*  (2006.01)
  *G06F 7/552*  (2006.01)
  *G06F 7/535*  (2006.01)

(52) U.S. Cl.
  CPC ............ *G06F 7/552* (2013.01); *G06F 7/5525* (2013.01); *G06F 17/17* (2013.01); *G06F 2207/5354* (2013.01)

(58) Field of Classification Search
  USPC .................................................. 708/500, 504
  See application file for complete search history.

(56) References Cited

U.S. PATENT DOCUMENTS

| | | | |
|---|---|---|---|
| 4,718,032 A * | 1/1988 | Irukulla | G06F 1/0356 708/650 |
| 5,563,818 A | 10/1996 | Agarwa | |
| 5,862,059 A * | 1/1999 | Matula | G06F 1/0356 708/270 |
| 6,223,192 B1 * | 4/2001 | Oberman | G06F 7/53 708/270 |
| 6,240,433 B1 | 5/2001 | Schmookler | |
| 6,397,238 B2 | 5/2002 | Oberman | |
| 7,167,887 B2 | 1/2007 | Kurd | |
| 7,543,008 B1 | 6/2009 | Matula | |
| 7,689,639 B2 | 3/2010 | Dent | |
| 9,348,796 B2 | 5/2016 | Kroener | |
| 2005/0144213 A1 | 6/2005 | Simkins | |
| 2013/0290685 A1 | 10/2013 | Corbal San Adrian | |

OTHER PUBLICATIONS

David L. Rager, et. al., Oracle, A Brief Introduction to Oracle's Use of ACL2 in Verifying Floating-Point and Integer Arithmetic, https://www.cs.utexas.edu/users/moore/acl2/workshop-2015/slides/rager-oracle/oracle-abstract-slides.pdf, Oct. 1, 2015.*
International Search Report and Written Opinion in application No. PCT/RU2016/000302 dated Jan. 26, 2017.

* cited by examiner

| Division | | Square Root | |
|---|---|---|---|
| $B_n$ | $T_n$ | $B_n$ | $T_n$ |
| Address | Lookup Value | Address | Lookup Value |
| 1.000 | 0.1111 | 0_1.00 | 0.1111 |
| 1.001 | 0.1110 | 0_1.01 | 0.1110 |
| 1.010 | 0.1100 | 0_1.10 | 0.1101 |
| 1.011 | 0.1101 | 0_1.11 | 0.1100 |
| 1.100 | 0.1010 | 1_1.00 | 0.1011 |
| 1.101 | 0.1001 | 1_1.01 | 0.1010 |
| 1.110 | 0.1001 | 1_1.10 | 0.1001 |
| 1.111 | 0.1000 | 1_1.11 | 0.1000 |

FIG. 4

METHODS FOR CONSTRUCTING LOOKUP TABLES FOR DIVISION AND SQUARE-ROOT IMPLEMENTATIONS

BACKGROUND

Technical Field

Embodiments described herein relate to integrated circuits, and more particularly, to techniques for performing iterative arithmetic operations within integrated circuits.

Description of the Related Art

Computing systems typically include one or more processors or processing cores which are configured to execute program instructions. The program instructions may be stored in one of various locations within a computing system, such as, e.g., main memory, a hard drive, a CD-ROM, and the like.

Processors include various functional blocks, each with a dedicated task. For example, a processor may include an instruction fetch unit, a memory management unit, and an arithmetic logic unit (ALU). An instruction fetch unit may prepare program instruction for execution by decoding the program instructions and checking for scheduling hazards, while arithmetic operations such as addition, subtraction, and Boolean operations (e.g., AND, OR, etc.) may be performed by an ALU. Some processors include high-speed memory (commonly referred to as "cache memories" or "caches") used for storing frequently used instructions or data.

Some arithmetic operations, such as, e.g., division, may involve iterative calculations performed over several computing cycles. Multiple iterations may be performed until a desired level of accuracy is achieved. In some cases, additional circuitry may be added to an ALU to support the iterative calculations.

SUMMARY OF THE EMBODIMENTS

Various embodiments of a computing system are disclosed. Broadly speaking, a circuit and a method are contemplated in which a multiplier unit includes a plurality of stages, each of which may be configured to perform a corresponding arithmetic operation. Control circuitry coupled to the multiplier unit may be configured to retrieve a first entry of a first plurality of entries stored in a first lookup table dependent upon a first portion of a binary representation of an input operand. For each entry of the first plurality of entries, an error value of an error function evaluated dependent upon a lookup value included in a given entry is included in a predetermined error range. The control circuitry may be further configured to determine an initial approximation of a result of an iterative arithmetic operation dependent upon a first portion of a binary representation of an input operand and initiate the iterative arithmetic operation using the initial approximation.

In one embodiment, the iterative arithmetic operation includes division and each entry of the plurality of entries includes an estimate for a reciprocal of the input operand.

In a further embodiment, the iterative arithmetic operation includes square root and each entry of the plurality of entries includes an estimate for a reciprocal of a root of the input operand.

BRIEF DESCRIPTION OF THE DRAWINGS

The following detailed description makes reference to the accompanying drawings, which are now briefly described.

FIG. 4 depicts a chart illustrating lookup table values.

Figure 1:
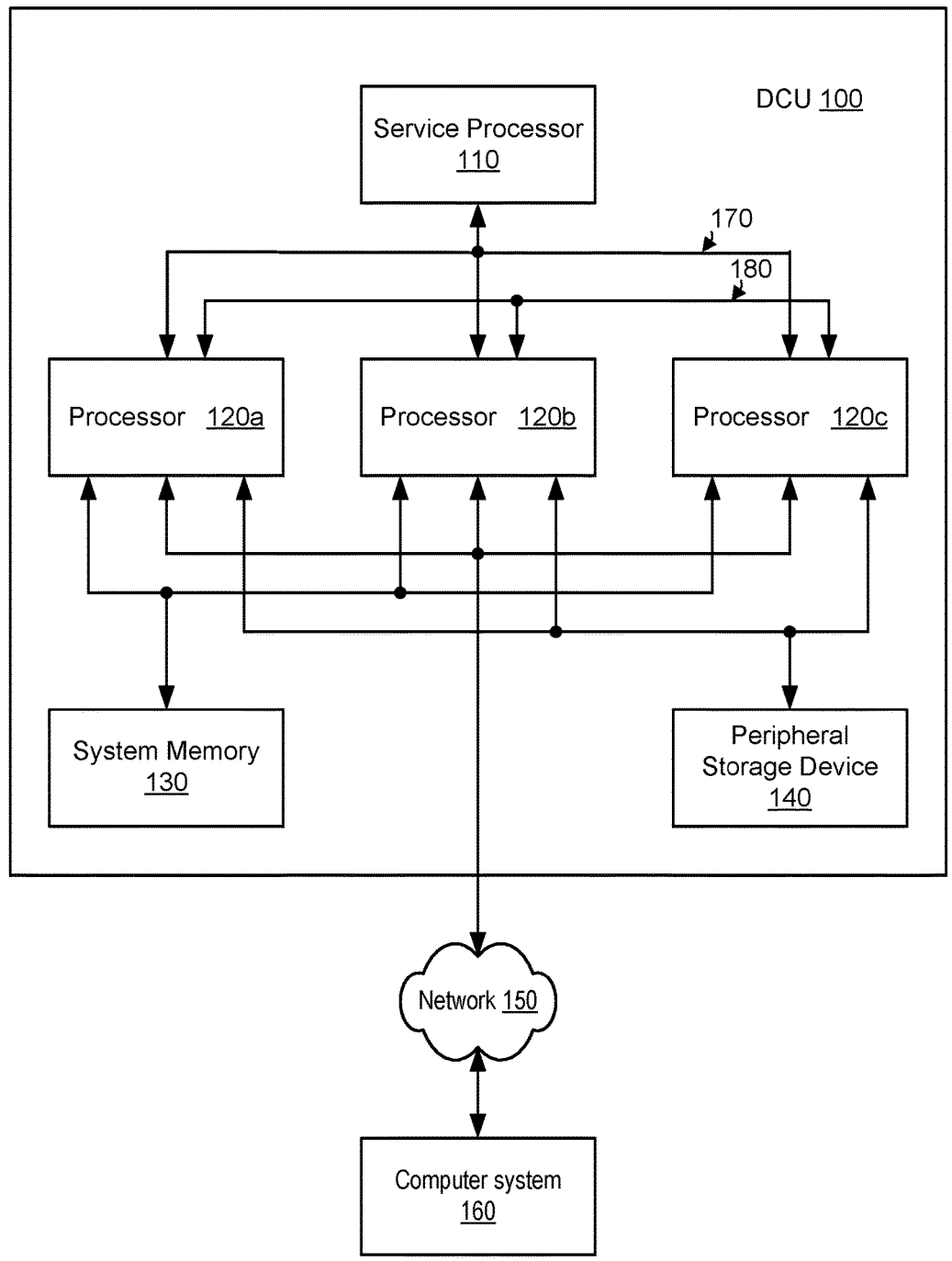
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

In a computing system, arithmetic operations may be performed by an arithmetic logic unit (ALU) of a processor.

The ALU may contain dedicated logic circuits, such as, e.g., an adder or multiplier, that are designed to perform certain arithmetic functions in an iterative fashion. For example, the Newton algorithm or the Goldschmidt algorithm may be employed for performing division or square root in an iterative fashion. After a number of iterations of a particular arithmetic operation, a final approximation may be generated. In order to determine the answer to the particular arithmetic operation, a rounding operation may be performed on the final approximation.

Prior to starting the iterative arithmetic operation, an initial approximation may be determined. In some cases, the initial approximation may be retrieved from a lookup table to start the iterative process. The accuracy of such initial approximation is important as an accurate initial approximation may reduce iterations, thereby saving computing cycles and power. In general, however, the more accurate the initial approximation, the larger the lookup table. Large lookup tables consume large amounts of area on an integrated circuit, which may result in a large chip and higher manufacturing costs. Additionally, large lookup tables may require additional energy to operation thereby increasing power consumption. The embodiments illustrated in the drawings and described below may provide techniques for constructing lookup tables while minimizing the size of the lookup tables.

A block diagram illustrating one embodiment of a distributed computing unit (DCU) 100 is shown in FIG. 1. In the illustrated embodiment, DCU 100 includes a service processor 110, coupled to a plurality of processors 120a-c through bus 170. It is noted that in some embodiments, system processor 110 may additionally be coupled to system memory 130 through bus 170. Processors 120a-c are, in turn, coupled to system memory 130, and peripheral storage device 140. Processors 120a-c are further coupled to each other through bus 180 (also referred to herein as "coherent interconnect 180"). DCU 100 is coupled to a network 150, which is, in turn, coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120a-c via a standard Small Computer System Interface (SCSI), a Fiber Channel interface, a Firewire® (IEEE 1394) interface, or another suitable interface. Additionally, it is contemplated that in other embodiments, any other suitable peripheral devices may be coupled to processors 120a-c, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120a-c, such as from a power-on reset state. Additionally, in some embodiments, service processor 110 may include a programmable read-only memory (PROM) that may store instructions to perform a power-on self-test (POST). In various embodiments, service processor 110 may be configured to allow access to administrative functions such as test and debug modes of processors 120a-c, such as testing cache memories in processors 120a-c, or providing test code to processors 120a-c such that each of processors 120a-c may test their respective cache memories, for example.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor core.

Figure 2:
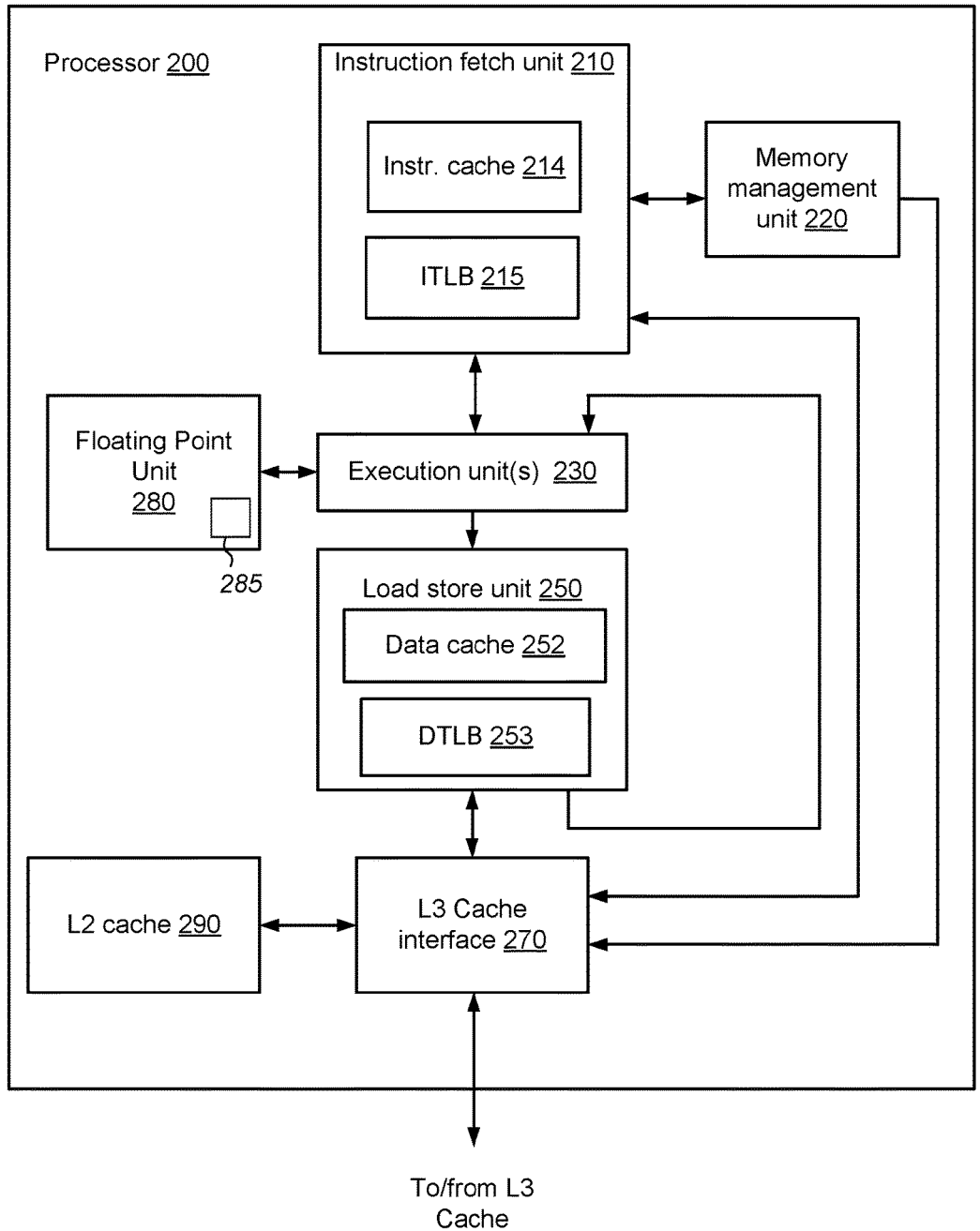
FIG. 2 illustrates an embodiment of a processor.

A possible embodiment of a processor is illustrated in FIG. 2. In the illustrated embodiment, processor 200 includes an instruction fetch unit (IFU) 210 coupled to a memory management unit (MMU) 220, a L3 cache interface 270, a L2 cache memory 290, and one or more of execution units 230. Execution unit(s) 230 is coupled to load store unit (LSU) 250, which is also coupled to send data back to each of execution unit(s) 230. Additionally, LSU 250 is coupled to L3 cache interface 270, which may in turn be coupled a L3 cache memory Instruction fetch unit 210 may be configured to provide instructions to the rest of processor 200 for execution. In the illustrated embodiment, IFU 210 may be configured to perform various operations relating to the fetching of instructions from cache or memory, the selection of instructions from various threads for execution, and the decoding of such instructions prior to issuing the instructions to various functional units for execution. Instruction fetch unit 210 further includes an instruction cache 214. In one embodiment, IFU 210 may include logic to maintain fetch addresses (e.g., derived from program counters) corresponding to each thread being executed by processor 200, and to coordinate the retrieval of instructions from instruction cache 214 according to those fetch addresses.

In one embodiment, IFU 210 may be configured to maintain a pool of fetched, ready-for-issue instructions drawn from among each of the threads being executed by processor 200. For example, IFU 210 may implement a respective instruction buffer corresponding to each thread in which several recently-fetched instructions from the corresponding thread may be stored. In some embodiments, IFU 210 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 210 may be configured to further prepare instructions for execution, for example by decoding instructions, detecting scheduling hazards, arbitrating for access to contended resources, or the like. Moreover, in some embodiments, instructions from a given thread may be speculatively issued from IFU 210 for execution. Additionally, in some embodiments IFU 210 may include a portion of a map of virtual instruction addresses to physical addresses. The portion of the map may be stored in Instruction Translation Lookaside Buffer (ITLB) 215.

Execution unit 230 may be configured to execute and provide results for certain types of instructions issued from IFU 210. In one embodiment, execution unit 230 may be configured to execute certain integer-type instructions defined in the implemented ISA, such as arithmetic, logical, and shift instructions. It is contemplated that in some embodiments, processor 200 may include more than one execution unit 230, and each of the execution units may or may not be symmetric in functionality.

Floating point unit (FPU) 280 may be configured to execute and provide results for certain floating-point and graphics-oriented instructions defined in the implemented ISA. For example, in one embodiment FPU 280 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Depending on the implementation, FPU 280 may include multiplier unit 285. As described below in more detail, multiplier unit 285 may be employed in an iterative fashion to approximate values for some arithmetic operations, such as, division, for example.

Load store unit 250 may be configured to process data memory references, such as integer and floating-point load and store instructions. In some embodiments, LSU 250 may also be configured to assist in the processing of instruction cache 214 misses originating from IFU 210. LSU 250 may include a data cache 252 as well as logic configured to detect cache misses and to responsively request data from L2 cache 290 or a L3 cache partition via L3 cache partition interface 270. Additionally, in some embodiments LSU 250 may include logic configured to translate virtual data addresses generated by EXUs 230 to physical addresses, such as Data Translation Lookaside Buffer (DTLB) 253.

It is noted that the embodiment of a processor illustrated in FIG. 2 is merely an example. In other embodiments, different functional block or configurations of functional blocks are possible and contemplated.

Figure 3:
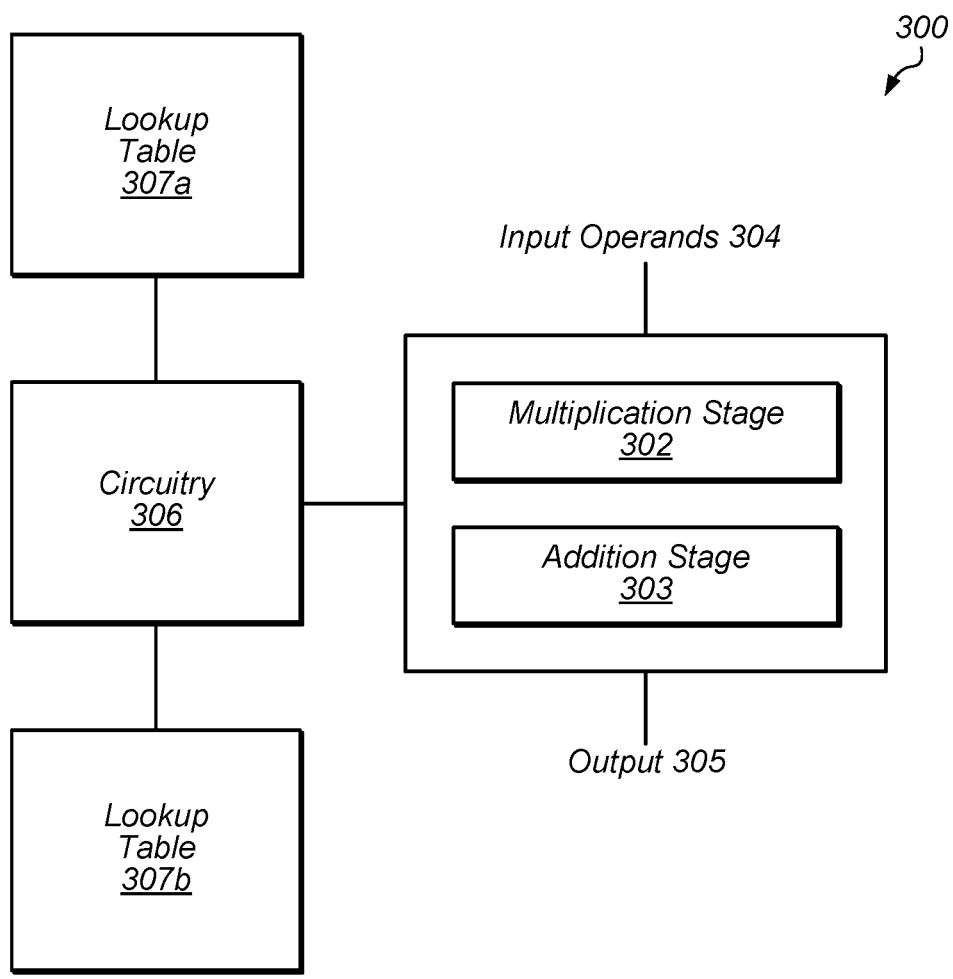
FIG. 3 illustrates an embodiment of a multiplier unit.

Turning to FIG. 3, an embodiment of multiplier unit is illustrated. In some embodiments, multiplier unit 300 may correspond to multiplier unit 285 as illustrated in FIG. 2. In the illustrated embodiment, multiplier unit 300 includes multiplication stage 302, addition stage 303, circuitry 306, and Lookup Tables 307a and 307b. Multiplier unit 300 may, in some embodiments, be used to implement one of various algorithms, such as Newton-Raphson or Goldschmidt, for example. In various embodiments, multiplier unit 300 may be configured to produce an approximation of a quotient of two floating-point numbers, a quotient of two integer numbers.

Each of multiplication stage 302, and addition stage 303 may be configured to operate on at least two operands, and may be designed in accordance with one of various multiplier architectures. For example, multiplication stage 302 of the aforementioned stages may employ Wallace Trees, or other suitable multiplier algorithm. In various embodiments, multiplier 300 may be configured to allow operands of any suitable length, such as, e.g., integer or floating-point operands.

As described below in more detail, when multiplier unit 300 is used to perform an iterative operation such as, e.g., floating-point division or integer division, input operands 304 are received and normalized by multiplier unit 300. Circuitry 306 may be configured to retrieve an initial approximation of the desired answer from either of Lookup Table 307a or Lookup Table 307b. Multiplication stage 302 may be used to perform repeated multiplication operations, starting with the initial approximation, in order to generate a final approximation for the desired quotient. When a desired level of precision has been achieved, circuitry 306 may format a remainder generated by the iterative division algorithm. Circuitry 306 may also be configured to retrieve respective values from each of Lookup Tables 307a and 307b, and combine the values in order to generate the initial approximation for the desired answer.

Each of Lookup Tables 307a and 307b may include a memory or other suitable storage circuits. In various embodiments, Lookup Tables 307a and 307b may include SRAMs, DRAMs, ROMs, Flash Memory, or any other suitable type of memory. As described below in more detail, an amount of storage, and the contents stored, may be determined according to one of various methods in order to minimize the amount of storage while maintaining a desired level of accuracy.

It is noted that the embodiment illustrated in FIG. 3 is merely an example. In other embodiments, different numbers of lookup tables and different configurations of lookup tables are possible and contemplated.

As described above in regard to FIG. 3, a multiplier unit may include one or more lookup tables which may include initial estimates for iterative arithmetic operations, such as, division or square root, for example. In the case of division, a lookup table may provide an estimate for 1/B for every value of B included in the half-open interval [1, 2). Alternatively, for square root operations, a lookup table may provide an estimate for $1/\sqrt{B}$ for every value of B included in the half-open interval [1, 4). The aforementioned intervals may be split into N segments $[B_n, B_{n+1})$ for $0 \le n < N$, wherein N is a positive integer. A lookup value $T_n$ may be assigned to each segment.

In the case of division, each $B_n$ may be represented in binary 1·x, where x has $k \ge 0$ bits and $N \le 2^k$. In some embodiments, not every k-bit representation x needs to occur in a binary representation of $B_n$. Each value x that occurs as 1·x in the sequence $B_n$, $0 \le n < N$, is commonly referred to as a key or address for a lookup value $T_n$. The value of $T_n$ may be an approximation of 1/B and may be included in the open interval (0.5, 1). $T_n$ may, in various embodiments, be of the form 0.1y, where y includes 1 data bits.

In the case of square root, the half-open interval [1, 4) may be split into two sub-intervals [1, 2) and [2, 4). Floating-point numbers with an even exponent will have a mantissa in [1, 2) and for floating-point numbers with odd exponents a 1 may be subtracted from the exponent and the mantissa may be doubled. The doubled mantissa will be in [2, 4). Each $B_n$ for a square root operation may be represented in binary by either 1·x (for even exponents) or 2*1·x (for odd exponents), where x includes k−1 bits. A single data bit may be used to indicate the parity of the exponent and k−1 bits may be used to represent x. The k bits may then be used as the key for the lookup table.

It is noted that for N segments and N addresses, we have $N \leq 2^k$. Thus, for any B included in [1, 4), the address for the lookup table is given by the least-significant bit of the exponent of B and the k−1 bits of the binary representation of B following the leading "1" bit. For square root, the lookup value $1/\sqrt{B}$ is included in the half-open interval (0.5, 1], so the lookup value may be of the form 0.1y or 1.

Turning to FIG. 4, an example of a lookup table for division and square root for k=3 and l=3 is illustrated. The address to the lookup table of FIG. 4 for division has 4 bits, of which the first bit is always a "1." The address to the lookup table for (floating-point) square root also has 4 bits, of which the first bit is the least significant bit of the exponent and the second bit is always a "1." The lookup values for division and square root each include 5 bits, of which the first two bits are always "0.1." It is noted that the table illustrated in FIG. 4 is merely an example. In other embodiments, bits that are constant in the address or a table entry may be omitted.

In the case of division, the lookup value for B, which is included in the half-open interval [1, 2), may be found by finding a segment $[B_n, B_{n+1})$ of which B is an element. It is noted that B is of the form 1·xz, where x includes k bits and z is some bit sequence. If B is in $[B_n, B_{n+1})$, then the lookup value is $T_n$. In order to check if B is included in $[B_n, B_{n+1})$, the address of B, i.e., the bit sequence of 1·xz, may be compared to values of $B_n$, where 0≤n<N. In some embodiments, the k-bit value of x from B is used as an address to retrieve the value y from a particular entry in the lookup table. A final lookup value may then be constructed by combining the value of y with "0.1" to generate T=0.1y. It is noted that the size of the lookup table is N*l bits. It is further noted that the above description is applicable to table lookup for division and that, in the case of square root, similar operations may be performed.

As described above, a lookup table may provide a first, or initial, approximation of a function value. After obtaining a first approximation, an approximation algorithm may successively improve upon the approximation through multiple iterations until the algorithm reaches a final approximation. The error in the final approximation depends on the error in the first approximation, the input values to the algorithm, and the algorithm itself. In various embodiments, an error requirement may be defined for the lookup table. As used and described herein, an error requirement is an amount of error less than a predetermined error limit. Additionally, a size limit may also be imposed on a lookup table.

For each segment, there may be many values $T_n$ that can be chosen as the lookup value for the segment $[B_n, B_{n+1})$ that satisfy the error requirement for the lookup table. For each segment a range of (l+2)-bit values from which $T_n$ may be selected may be constructed. This range may be denoted as $[Tmin_n, Tmax_n]$. Any (l+2)-bit value of $T_n$ of the form 0.1y in $[Tmin_n, Tmax_n]$ may be a valid lookup value for the segment $[B_n, B_{n+1})$.

Figure 5A:
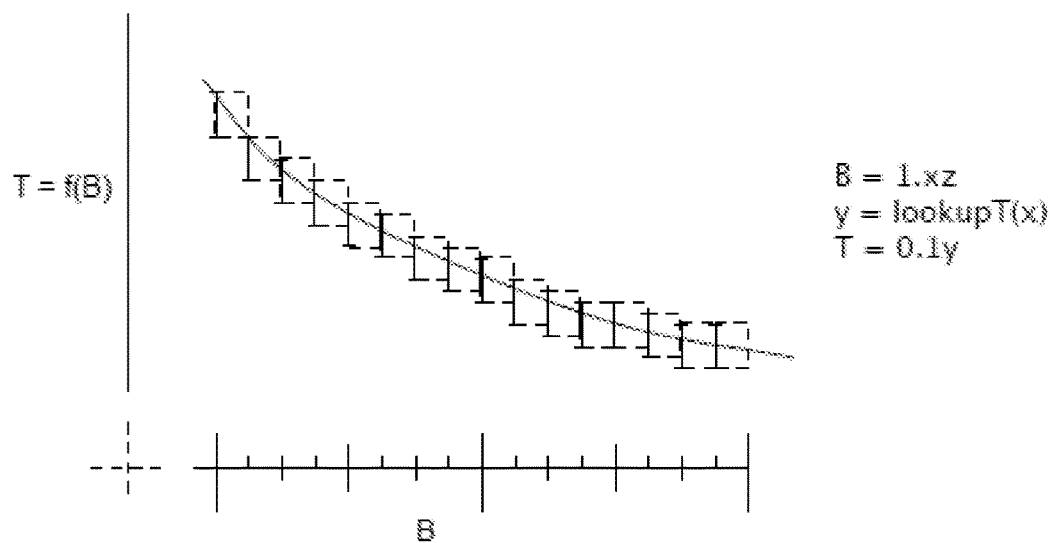
FIG. 5a depicts a graph illustrating lookup table values with equal segments.
Figure 5B:
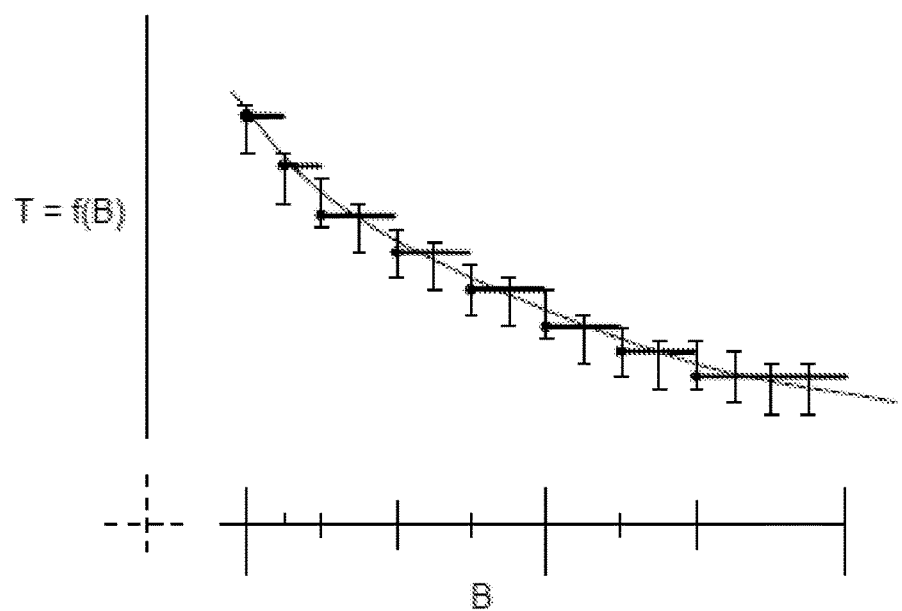
FIG. 5b depicts a graph illustrating lookup table values with segments of different sizes.

Turning to FIG. 5A and FIG. 5B, examples of lookup tables and ranges for lookup values are illustrated. FIG. 5A depicts a case including 16 equal length segments. Each of the segments has a range for lookup values as denoted by an associated error bar. FIG. 5B depicts a case including 8 segments. The segments included in FIG. 5B may not be of the same length, and each segment has a single lookup value designated by a corresponding horizontal line.

In some embodiments, the segments included in FIG. 5B may be derived from those included in FIG. 5A by merging neighboring segments that differ in their least-significant address bit and that have overlapping lookup ranges. In the event that the lookup ranges have a non-empty intersection, any single lookup value from the intersection may be selected as the lookup value for the merged segments. By merging segments, the number of segments is reduced along with the number of lookup values.

In determining the number of segments for a lookup table, selecting large segments may result in not being able to satisfy the error requirement for some of the segments. Alternatively, if small segments are selected, the error requirement may be satisfied for each segment, but the total number of segments may be large, resulting in a large lookup table. It is noted that not all of the segments need to be the same size and that boundaries for the segments should be represented with binary numbers including as few bits as possible.

For division operations, a relative error for entries in a lookup table may be defined as shown in Equation 1, where u is the relative error for a given B included in $[B_n, B_{n+1})$. The range of values of u is important in the construction of a lookup table.

$$u = 1 - BT_n \quad (1)$$

If B is included in $[B_n, B_{n+1})$, then the range of possible values for u may be denoted as $UDIV_n$ as depicted in Equation 2. The value of $T_n$ may then be chosen such that the interval $UDIV_n$ is symmetric around 0. In some embodiments, $T_n$ is selected as the (l+2)-bit value that is closest to $2/(B_n+B_{n+1})$.

$$UDIV_n = (1 - B_{n+1}T_n, 1 - B_nT_n] \quad (2)$$

A relative error for a segment included in a lookup table for square root operations may be determined in a similar fashion. In this case, the relative error u may be defined as depicted in Equation 3. The range of values for u may be defined as shown in Equation 4. The value of $T_n$ may then be chosen so that the interval $USQRT_n$ is symmetric around 0.

$$u = 1 - BT_nT_n \quad (3)$$

$$USQRT_n = (1 - B_{n+1}T_nT_n, 1 - B_nT_nT_n] \quad (4)$$

The choice for the segments and for the corresponding lookup values determine whether or not the error requirement will be satisfied. The error requirement stipulates that the error in the final approximation is below a predetermined error threshold. The error in the final approximation may defined as shown in Equation 5, where approx. is the value produced by the approximation algorithm, and exact is the exact solution.

$$\text{Error} = \text{approx} - \text{exact} \quad (5)$$

The error in the final approximation may depend on a variety of factors. For example, for the quotient A/B, the error in the final approximation depends on the approximation algorithm, and the values A, T, u, and eps, where eps is a vector of truncation errors made at various stages in the Goldschmidt algorithm. It is noted that the value of B determines the lookup value T and the relative error u.

Since the approximation algorithm is a succession of arithmetic operations such as, e.g., addition, multiplication, and the like, the expression for the error in the algorithm is a polynomial in the variables u, A, T, and eps. For the purpose of creating the lookup tables, the exact expression for the error in the algorithm is not necessary, as long as there is an expression for the error. In the description that follows, the expression for the error in the algorithm will be denoted by the function Error(A,T,u,eps).

Each of the parameters A, T, u, and the elements of vector eps, is included in a given interval. For example, A may be included in the half-open interval [1, 2) and each element of eps may be included in the half-open interval [0, $2^{-M}$) where M is a positive integer. Moreover, for each n included in $0 \le n < N$, there is a fixed lookup value $T_n$ and an interval $U_n$ for the relative error u. Since the aforementioned parameters are individually bounded, the overall error in the algorithm may also be bounded as depicted in Equation 6.

$$\text{LowerBound} < \text{Error}(A, T_n, u, eps) < \text{UpperBound} \tag{6}$$

LowerBound and UpperBound are the desired lower and upper bounds for the Error function. For example, in one particular implementation of the Goldschmidt algorithm for floating-point division, LowerBound=0 and UpperBound=ulp/4, where ulp=$2^{-52}$ for double-precision and ulp=$2^{-23}$ for single-precision division. In another example using the Goldschmidt algorithm to implement floating-point square root, LowerBound=0 and UpperBound=ulp/2, where ulp=$2^{-52}$ for double-precision and ulp=$2^{-23}$ for single-precision square root.

In some embodiments, the previously described error bounds may depend on the choice n for $0 \le n < N$. In particular, the error bounds may depend on the value of $B_n$. By allowing error bounds that vary with n, the error requirement may be relaxed and the process of finding lookup values for each segment may be simplified. When variable error bounds are employed, Equation 6 may be modified as shown in Equation 7.

$$\text{LowerBound}_n < \text{Error}(A, T_n, u, eps) < \text{UpperBound}_n \tag{7}$$

As described above, when employing variable error bounds, the error requirement may be relaxed. For example, in the case of 64-bit integer division, fixed error bounds for all n may be selected as shown in Equations 8 and 9, where ulp=$2^{-63}$.

$$\text{LowerBound}=0 \tag{8}$$

$$\text{UpperBound}=2ulp \tag{9}$$

If, however, in the case of variable error bounds, the error bounds may be selected as shown in equations 10 and 11, where $g(B_n)$ is a function of $B_n$ returning a natural number. In the case of integer division, the function $g(B_n)$ may be defined as shown in Equation 12, where $B_n=1 \cdot x$ for any string of x of k bits.

$$\text{LowerBound}_n=0 \tag{10}$$

$$\text{UpperBound}_n=2ulp2^{g(B_n)} \tag{11}$$

$$g(1 \cdot x)=k-m(x) \tag{12}$$

The function m(x) may return the number of trailing zeros in x. It is noted that, in general, $0 \le g(1 \cdot x) \le k$. When x is a string of k zeros, the m(x)=k, so $g(1 \cdot x)=0$. For other values of x, $g(1 \cdot x)>0$. With variable bounds for integer division the error interval may be enlarged for most segments by several factors 2. It is noted that although the above description is generally directed towards integer division, similar techniques may be employed for other operations, such as, floating-point division, and square root operations, for example.

In the case when integer division and floating-point division used the same lookup table, then the requirements associated with each operation must be combined for the lookup table to ensure that the error requirement is satisfied for both integer division and floating-point division. For example, a combined lookup table for 64-bit integer division and floating-point division (both single and double precision) may use variable error bounds as defined in Equations 13 and 14.

$$\text{LowerBound}_n=0 \tag{13}$$

$$\text{UpperBound}_n=\min(2^{-53}, 2^{-62+g(B_n)}) \tag{14}$$

Figure 6:
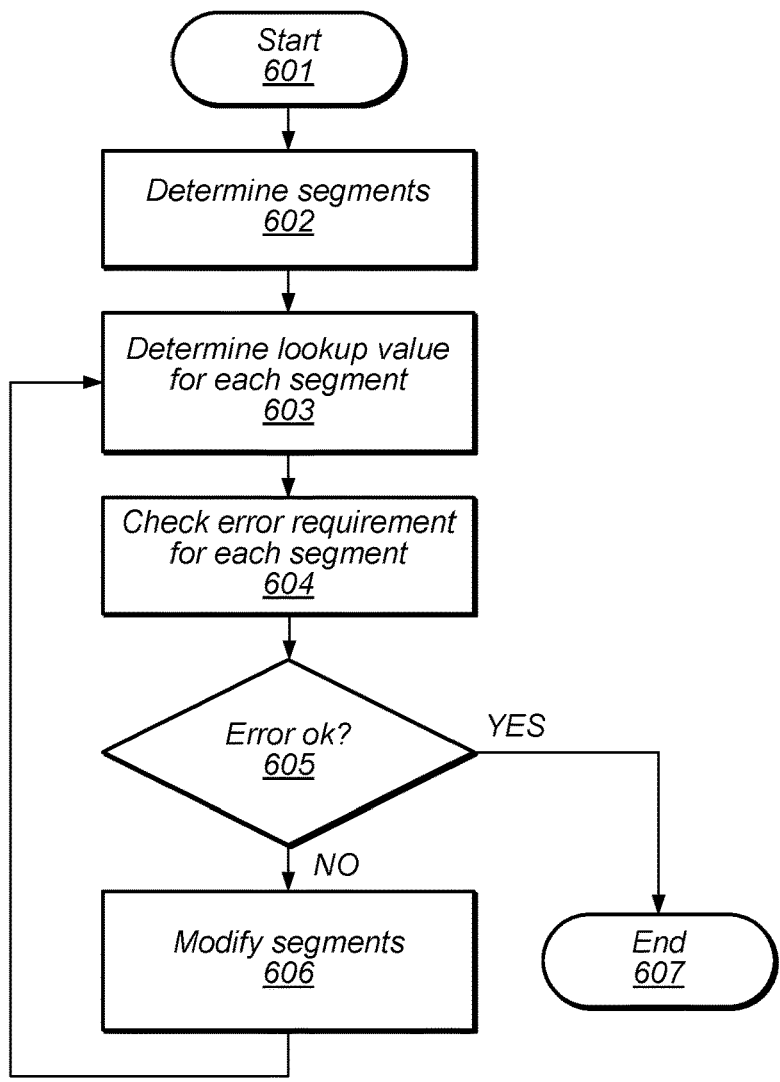
FIG. 6 depicts a flow diagram illustrating an embodiment of a method for determining segments for a lookup table.

Turning to FIG. 6, a flow diagram depicting an embodiment of a method for generating a lookup table is illustrated. The method begins in block 601. A number of segments may then be determined (block 602). As described above, the number of segments may be selected in order to minimize a size of the lookup table while still providing sufficient accuracy.

Once the segments have been determined, lookup value ranges and lookup values for each segment may then be determined (block 603). As described below, lookup ranges may be determined by checking smaller intervals in order to reduce computational time and resources. The error requirement may then be checked for candidate lookup values within a particular lookup range (block 604). The method may then depend on results of the error requirement check (block 605).

If the error requirement is satisfied for all segments, the method may conclude in block 607. Alternatively, if the error requirement is not satisfied for all segments, the choice of segments may be modified (block 606). As described below in more detail, segments may be divided into smaller segments, or pairs of adjacent segments may be merged into larger segments.

It is noted that the embodiment of the method illustrated in FIG. 6 is merely an example. In other embodiments, different operations and different orders of operations are possible and contemplated.

As described above in regard to block 603, for each segment, a range of possible lookup values may be determined. For a given segment, there may be multiple possible values of $T_n$ that may satisfy the error requirement. For example, if an interval is calculated for Error(A,$T_n$,u,eps) for each (l+2)-bit value T in [$\text{Tmin}_n$, $\text{Tmax}_n$], where l+2 is the number of output bits included in T, and the error requirement holds for all of the (l+2)-bit values T in [$\text{Tmin}_n$, $\text{Tmax}_n$], then range [$\text{Tmin}_n$, $\text{Tmax}_n$] of lookup values for the given segment is valid.

Checking if each value of T satisfies the error requirement may be computationally expensive. To reduce the computational effort, a pool of candidate values of T may be created, wherein each candidate value included in the pool satisfies a weaker version of the error requirement.

To generate a pool of candidates for the interval [$\text{Tmin}_n$, $\text{Tmax}_n$], smaller intervals may be checked to see if Equation 7 holds. Specific choices of A, u, and eps, as depicted in Table 2, may be used during the checking process. For each choice of T, the values of $U_{min,n}$ and $U_{max,n}$ are given by Equations 15 and 16.

TABLE 1

Interval Choices for A, u, and eps, where EPS is defined as a vector of intervals for all truncation errors.

| A | u | eps |
|---|---|---|
| A = 1 | u = $U_{min, n}(T)$ | eps $\in$ EPS |
| A = 1 | u = $U_{max, n}(T)$ | eps $\in$ EPS |
| A = 2 | u = $U_{min, n}(T)$ | eps $\in$ EPS |
| A = 2 | u = $U_{max, n}(T)$ | eps $\in$ EPS |

$$U_{min,n}(T) = 1 - B_{n+1}T \quad (15)$$

$$U_{max,n}(T) = 1 - B_n T \quad (16)$$

Only the values for eps are only taken over a series of small intervals. A, T, and u are constants for each of the four evaluations. It is noted that the four choices for A and u are the four corners points of the intervals A∈[1, 2) and u∈[$U_{min,n}(T)$, $U_{max,n}(T)$). When a particular interval evaluation fails, then the corresponding value of T is eliminated as a possible candidate.

Once a pool of candidate values of T has been obtained for the range [$Tmin_n$, $Tmax_n$], an interval evaluation for each candidate T may be performed. If the interval evaluation fails, it may still be possible that the constraints are satisfied, but that the interval evaluation is too pessimistic. After such a failure, an interval may be split into smaller intervals, which still cover the whole space of intervals and perform an interval evaluation for the smaller intervals. If all smaller interval evaluations satisfy the error constraints, then T is a valid choice. Otherwise, T is determined to be an invalid choice.

It is noted that interval evaluations for specific small intervals may be convenient for performing a quick check and for generating candidate values of T for the range [$Tmin_n$, $Tmax_n$]. Such specific small intervals may not cover the complete interval, resulting in the need to perform an interval evaluation for the complete interval. Evaluations for large intervals, however, may take longer due to the possibility of many interval splits, and may be more pessimistic.

Figure 7:
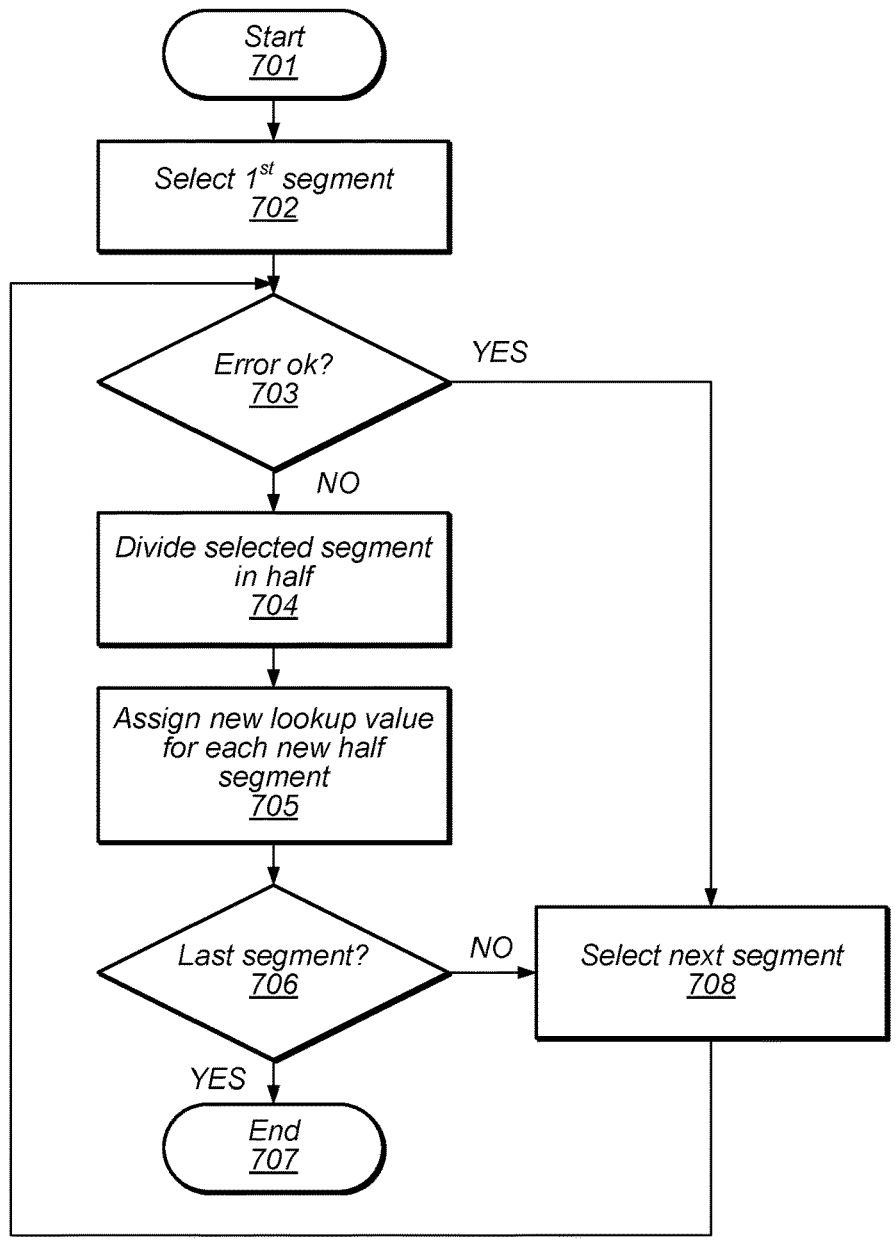
FIG. 7 depicts a flow diagram illustrating an embodiment of a method for modifying segments for a lookup table.

Turning to FIG. 7, a flow diagram depicting an embodiment of a method for creating segments and their corresponding lookup values is illustrated. In various embodiments, the flow diagram of FIG. 7 may correspond to block 606 of the flow diagram depicted in FIG. 6. The method starts in block 701. A first segment of multiple segments may then be selected (block 702).

The method may then depend on if the segment and its associated lookup value satisfy the error requirement (block 703). If the error requirement is satisfied, then the method may proceed, as described below, from block 708. If, however, the Error function does not result in a sufficiently small error for the parameters associated with the selected segment, then the selected segment may be divided in half (block 704). Dividing a segment in half roughly divides the relative error u for the segment, thereby reducing the value of the Error function as well.

A new lookup value may then be assigned for each new half segment (block 705). In various embodiments, the lookup value may be selected such that relative error for the segment is approximately symmetric around 0. The method may then depend on which segment is being evaluated (block 706). If the currently selected segment is the last segment, then the method may conclude in block 707. Alternatively, if the currently selected segment is not the last segment, then a next segment is selected (block 708) and the method may proceed from block 703 as described above.

It is noted that the embodiment depicted in the flow diagram of FIG. 7 is merely an example. In other embodiments, different operations and different orders of operations may be employed.

Figure 8:
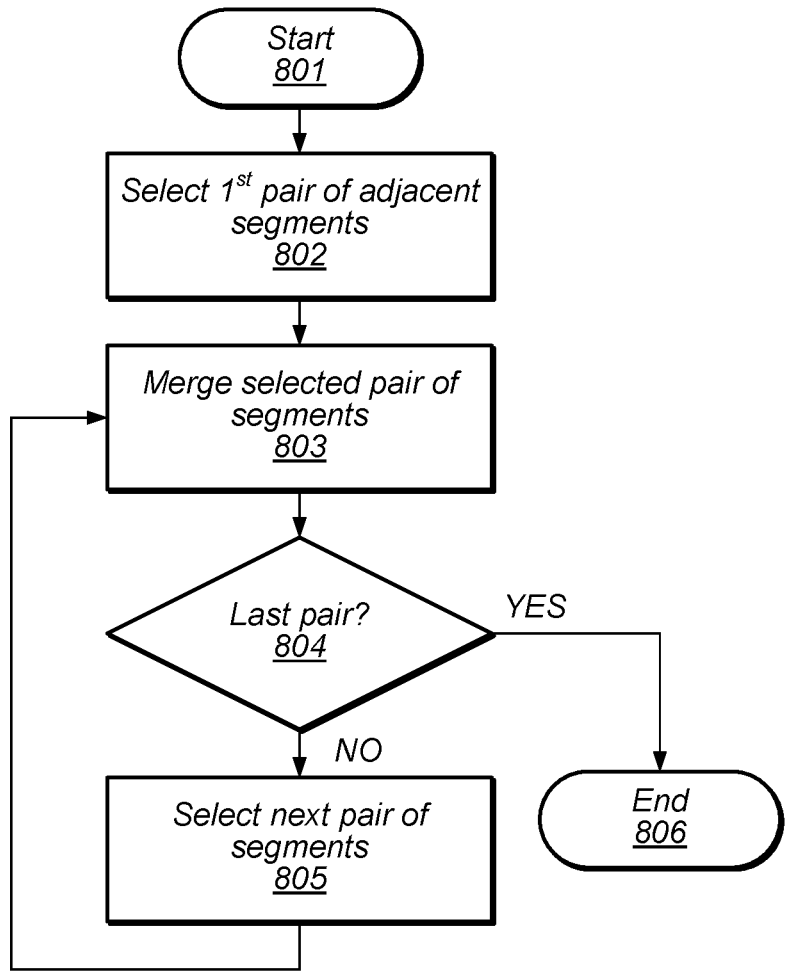
FIG. 8 depicts a flow diagram illustrating an embodiment of another method for modifying segments for a lookup table.

When all of the segments have the same fixed upper and lower bounds, then segments may be merged in order to generate a new set of segments that includes less segments than the original set of segments. A flow diagram depicting an embodiment of method for merging segments is illustrated in FIG. 8. In various embodiments, the flow diagram of FIG. 8 may correspond to block 606 of the flow diagram depicted in FIG. 6. The method may begin in block 801.

A first pair of adjacent segments may then be selected (block 802). In various embodiments, each segment in the selected pair of segments may have keys that differ only in their least-significant bit. In other words, the lookup ranges of the two segments have a non-zero intersection.

The selected pair of segments may then be merged into a single segment (block 803). In some embodiments, the range of lookup values for the merged segment may be the intersection of the lookup ranges for the two unmerged segments. Since the error requirement is met for each of the unmerged segments, the error requirement will also be satisfied for the merged segment since the lookup value will be greater than the largest minimum value of the two unmerged segments and less than the smallest maximum value of the two unmerged segments. The method may then depend on if the selected pair is the last available pair (block 804).

If the selected pair is the last available pair, then the method may conclude in block 806. Alternatively, if addition segment pairs are available, then a next pair of segments is selected from the available set of segments (block 805). The method may then proceed from block 803 as described above. By merging segments in this fashion, the total number of segments may be reduced while still meeting the error requirements, thereby reducing the size of the lookup table.

It is noted that the embodiment of the method illustrated in FIG. 8 is merely an example. In other embodiments, different operations and different orders of operations are possible and contemplated.

The techniques described above may be applied to creating multiple lookup tables. An initial approximation for an iterative arithmetic operation may be generated using values from two different lookup tables. As shown in Equation 17, an initial approximation y may be generated by using values v and s from two different lookup tables by applying a multiplication and addition operation. As described below, $x_t$ is some trailing bits from address x.

$$y = v + sx_t \quad (17)$$

The address x may be split into three sections (x=$x_s x_v x_t$) where $x_s$ is the address for one lookup table, $x_s x_v$ is the address for the other lookup table. The relationship between the variables used to generate the initial approximation using two tables are depicted in Table 2.

TABLE 2

Variable Relationships

Figure 9:
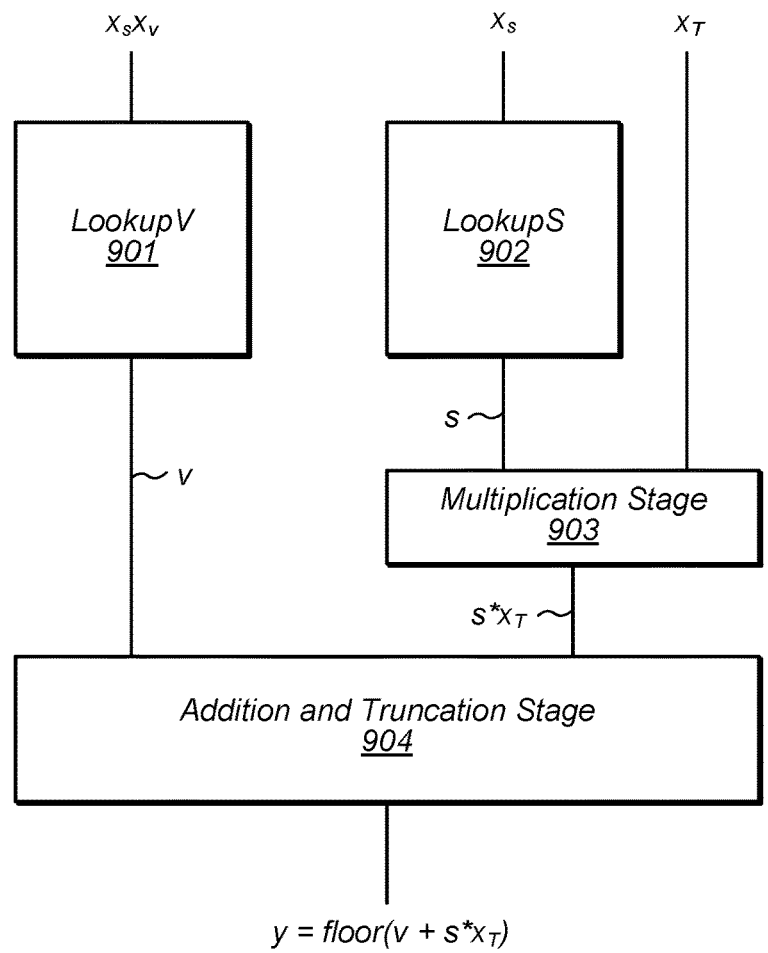
FIG. 9 illustrates a block diagram for generating an initial approximation for an iterative arithmetic operation using two lookup tables.

B = 1.$x_s x_v x_t$
s = lookupS($x_s$)
v = lookupV($x_s x_v$)
y = v + s × $x_t$
T = 0.1y Turning to FIG. 9, a functional diagram depicting the use of two lookup tables is illustrated. The illustrated embodiment includes LookupV 901, LookupS 902, Multiplication Stage 903, and Addition and Truncate Stage 904. It is noted, that the embodiment depicted in FIG. 9 may correspond to the embodiment illustrated in FIG. 3, in some cases. The lookup values from LookupV 901 is v, and the lookup value from LookupS 902 is s. As described above, LookupV 901 is accessed using bits $x_s x_v$ of B and LookupS 902 is accessed using bits $x_s$. Bits $x_t$ may be multiplied by s in Multiplication Stage 903, and resultant product ($s*x_t$) may be added to v by Addition and Truncate Stage 904.

In various embodiments, LookupV 901 has at least as many rows as LookupS 902, since there are at least as many address bits for LookupV 901 as there are for LookupS 902. Access time for LookupV 901 may be at least that of LookupS 902. It is desirable to keep the number of bits included in $x_t$ as small as possible to reduce the time required to perform the multiplication operation in Multiplication Stage 903.

In order for y to be sufficiently accurate, the value for T=0.1y must satisfy the error requirement for the case of a single lookup table. This translates to the following condition: for each value of $B=1 \cdot x_s x_v x_t$ included in $[B_n, B_{n+1})$, where $0 \leq n < N$, and $y=v+s \times x_t$, then T=0.1y and T is an element of the interval $[Tmin_n, Tmax_n]$.

Tables LookupV 901 and LookupS 902 must satisfy the above-referenced condition on T. Moreover, the sizes of LookupV 901 and LookupS 902 may be selected to be smaller than a single large lookup table. The total size of a single lookup table is N×l, where $N=2^k$ and k=length(x) and l=length(y). The size of LookupS 902 may be given by $2^{length(x_s)} \times p$, where p is the length of entries in LookupS 902. The size of LookupV 901 may be given by $2^{length(x_s x_v)} \times q$, where q is the length of entries included in LookupV 901.

Figure 10:
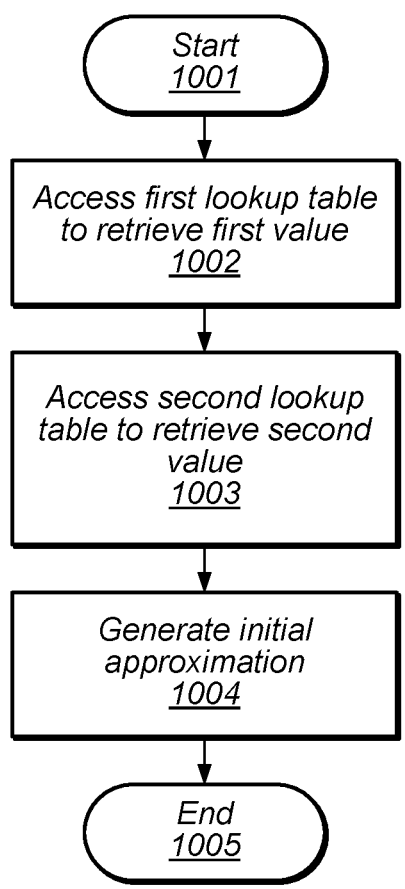
FIG. 10 depicts a flow diagram illustrating an embodiment of a method for generating an initial approximation for an iterative arithmetic operation using two lookup tables.

Turning to FIG. 10, a flow diagram depicting an embodiment of a method for using two lookup tables is illustrated. The method begins in block 1001. A first lookup table may then be accessed to retrieve a first lookup value (block 1002). For example, in some embodiments, LookupV 901 may be accessed using bits $x_s$ and $x_v$ to retrieve value v. A second lookup table may then be accessed to retrieve a second lookup value (block 1003). For example, LookupS 902 may be accessed using bits $x_s$ of B to retrieve a value for s.

Using the first and second lookup values, a value for initial approximation may then be generated (block 1004). In various embodiments, the value for the initial approximation may be generated by multiplying bits $x_t$ of B by the value of s retrieved from LookupS 902. The resultant product may then be added to the value v retrieved from LookupV 901. The value of the initial approximation may then be generated by appending using the resultant sum as the decimal portion of T=1·y. Once the value of the initial approximation has been generated, the method may conclude in block 1005.

Although the operations in the flow diagram of FIG. 10 are depicted as being performed in a sequential fashion, in other embodiments, one or more of the operations may be performed in parallel.

Figure 11:
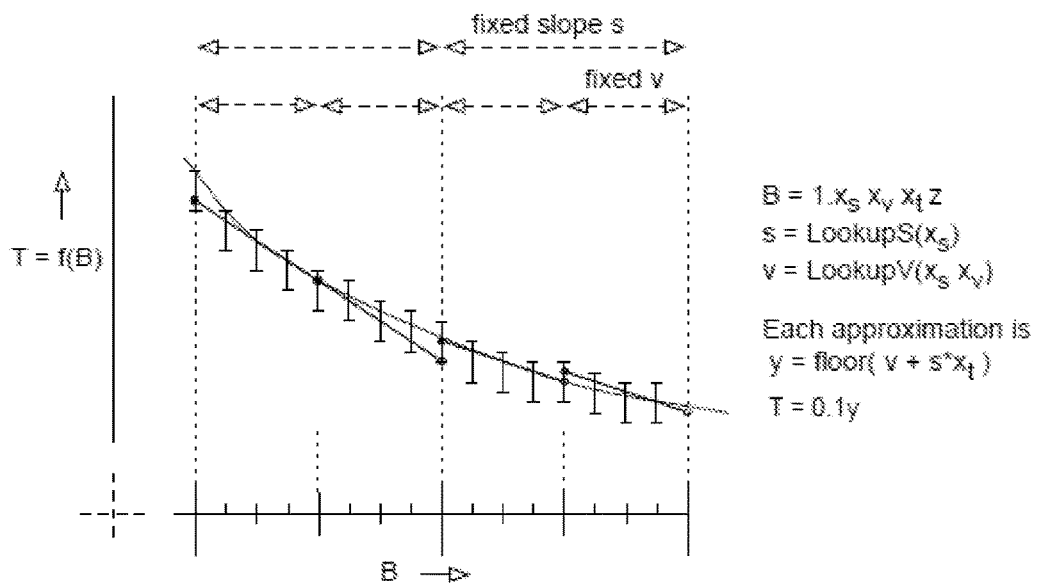
FIG. 11 depicts a graph of a piecewise linear approximation of an ideal lookup curve.

An example of a solution using two lookup tables is depicted in FIG. 11. In the illustrated example, there are 16 segments. Each choice of $x_s$, $x_v$, and $x_t$ determines a particular segment boundary $B_n = 1 \cdot x_s x_v x_t$. In the present example, $x_t$ includes 2 data bits and $x_s$ and $x_v$ each include a single data bit. Each of the 16 segments has a corresponding lookup range $[Tmin_n, Tmax_n]$ from which lookup values may be selected. The error bars associated with each segment indicate the range of lookup values. It is noted that although the error bars are depicted as being the same size, in other embodiments, the error bars may be of different sizes.

The lookup values for the 16 segments are obtained using two pairs of lines. Each pair of lines has the same slope, but different y-intercepts. The intersection of each line with an error bar for a particular segment yields the lookup value for that segment. It is noted that each of the lines intersect the error bars, indicating that points at the segment boundaries satisfy the error requirement. The present example illustrates that 16 lookup values may be determined for 16 segments using a linear combination of lookup values from two small lookup tables. For example, two entries included in LookupS 902 may correspond to the two slope values, and four entries included in LookupV 904 may correspond to the four y-intercept values. It is noted that since $x_t$ includes two data bits, a multiplication stage, such as, e.g., Multiplication Stage 903, may include a 2-by-p multiplier.

It is noted that in some embodiments, if $x_t$ includes only a few data bits, the multiplication stage may be removed, and the product of s and $x_t$ may be stored in one of the lookup tables instead of just the values for s. The number of rows in the lookup table for the product of s and $x_t$ is $2^{length(xt)}$ times the number of rows in LookupS 902. With each added bit in $x_t$, the size of the lookup table may double. It is noted that this is just one example of how the multiplication may be implemented when $x_t$ includes only a few data bits.

Figure 12:
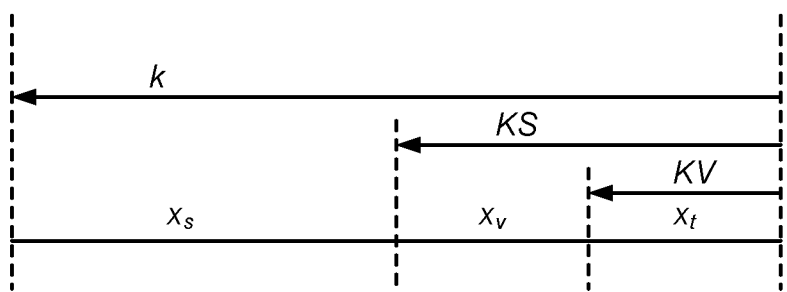
FIG. 12 illustrates a diagram depicting the relationship between the lengths of portions of an initial approximation for an iterative arithmetic operation.

The sizes for the aforementioned lookup tables, LookupS and LookupV, may be determined by the sizes of the bit vectors $x_s$ and $x_v$, respectively, and the number of bits in the individual entries in the lookup tables. Lengths of various vectors used in the determination of the sizes for the lookup tables are illustrated in Table 2. The relationship between the various lengths of the vectors is further illustrated in FIG. 12.

TABLE 3

Vector Sizes

KV = length($x_t$)
KS = length($x_v x_t$)
k = length($x_s x_v x_t$)
p = number of bits in entries in LookupV
q = number of bits in entries in LookupS Referring to Table 3, a determination is made for each value of KV if there is a value for KS that can be used to construct the two lookup tables. A further determination may be made as to which value of KS is the best value to use in the table construction. The sizes of the entries, p and q in the two tables may then be determined. For a given value of KV there may be multiple values of KS such that all entry values in the two lookup tables can be determined. In general, a larger value of KS may provide for a smaller combined size of the two lookup tables. It is noted that for each increment in KS, the size of the lookup table for s approximately decreases by a factor of two. Using the definitions in Table 2, the sizes of the various lookup tables may be determined as shown in Table 4.

TABLE 4

Sizes of Lookup Tables

| Lookup Table | Size |
|---|---|
| LookupT | $12^k$ |
| LookupS | $p2^{(k-KS)}$ |
| LookupV | $q2^{(k-KV)}$ |

Defining the quantity $x=x_s x_v x_t$ implies that for each choice of x there is a corresponding value of $B_n$ since $1 \cdot x = B_n$. For each set of vectors $x_s$ and $x_v$, there may be multiple choices for lookup values v and s, such that a pair (v, s) satisfies Equations 18 and 19 for all vectors $x_t$.

$$T\min_n \leq \text{floor}(v + sx_t) \quad (18)$$

$$\text{floor}(v + sx_t) \leq T\max_n \quad (19)$$

Each choice of v and s corresponds to a linear approximation of a part of the curve, where v is the y-intercept and s is the slope. For a given $x_s$ and $x_v$, each choice of $x_t$ corresponds to a segment boundary $B_n = 1 \cdot x_s x_v x_t$. Equations 18 and 19 imply that the linear approximation must intersect the error bar, i.e., lookup value ranges, for each segment boundary.

For vectors $x_s$ and $x_v$, if there is at least one pair (v, s) which satisfies Equations 18 and 19, then $s_{min}(x_s, x_v)$ may be defined as the minimum value of s and $s_{max}(x_s, x_v)$ may be defined as the maximum value of s of all possible pairs of (v, s). If there are no pairs (v, s) which satisfy Equations 18 and 19, then $s_{max} = +\infty$ and $s_{max} = -\infty$. The values for $s_{min}$ and $s_{max}$ may, in various embodiments, be determined using a linear optimization algorithm.

For example, for each $x_s$ the intersection, rangeS($x_s$), of all intervals $[s_{min}(x_s, x_v), s_{max}(x_s, x_v)]$ may be computed for all vectors $x_v$. If rangeS($x_s$) is empty, then there is no lookup value for $x_s$. Alternatively, if rangeS($x_s$) is not empty, then any element from rangeS($x_s$) may be selected as the lookup value for lookupS($x_s$). Once the lookup value for lookupS ($x_s$) has been selected, a value v for lookupV($x_v$) may be selected for each vector $x_v$, such that (v, s) satisfies Equations 18 and 19 for all values of $x_t$. It is noted that, because s is included in $[s_{min}(x_s, x_v), s_{max}(x_s, x_v)]$, the aforementioned value for v must exist.

For fixed values of KV and KS, if lookup values for $x_s$ and $x_v$ have been found, then lookup tables lookupS and lookupV have also been found for this particular set of KV and KS. If, however, for some $x_s$, there is no lookup value, then there are no lookup tables for this particular value of KV and KS.

It is desirable to choose values for s and v with the least number of bits. A smaller bit width for s, decreases the bit-width of the multiplication stage, such as, e.g., Multiplication Stage 903, since the bit-width of the multiplication stage is a function of s and $x_t$. A smaller bit-width for v may decrease the bit-width of the Addition and Truncation Stage, such as, e.g., Addition and Truncation Stage 904, which is determined by the bits included in v and the product of s and $x_t$.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of circuit stages, wherein each circuit stage of the plurality of circuit stages is configured to perform a corresponding arithmetic operation;
   a first lookup table including a first plurality of entries that includes a particular value indicative of a first portion of an initial estimate of a result of an iterative arithmetic operation;
   a second lookup table including a second plurality of entries that includes a different value indicative of a second portion of the initial estimate of the result of the iterative arithmetic operation; and
   a circuit coupled to the plurality of circuit stages, wherein the circuit is configured to:
      receive an input operand expressed in a binary representation that includes a fractional part having non-overlapping first, second, and third portions;
      retrieve a first value from the first lookup table using the first and second portions of the input operand;
      retrieve a second value from the second lookup table using the second portion of the input operand, but not the first or third portions;
      multiply the second value and the third portion of the input operand to generate a first intermediate value;
      add the first value and the first intermediate value to generate a second intermediate value;
      truncate the second intermediate value to generate an initial approximation; and
      initiate the iterative arithmetic operation using the initial approximation of the result.

2. The apparatus of claim 1, wherein the iterative arithmetic operation includes division.

3. The apparatus of claim 1, wherein the iterative arithmetic operation includes square root.

4. The apparatus of claim 1, wherein the particular value is based on a value of a particular operation specified in the iterative arithmetic operation evaluated on a particular half open interval.

5. The apparatus of claim 4, wherein the different value is based on another value of the particular operation evaluated on a different half open interval.

6. A method, comprising:
   receiving, by a processor circuit, an input operand for an iterative arithmetic operation, wherein the input operand is expressed in a binary representation that includes a fractional part having non-overlapping first, second, and third portions;
   retrieving, by a control circuit included in the processor circuit, a first value from a first lookup table using the first and second portions, wherein the first value is indicative of a first portion of an initial estimate of the iterative arithmetic operation; and retrieving, by the control circuit, a second value from a second lookup table using the second portion, but not the first and third portions, wherein the second value is indicative of second portion of the initial estimate of the iterative arithmetic operation;

multiplying, by a multiplier circuit included in the processor circuit, the second value and the third portion of the input operand to generated a first intermediate value;

adding, by an adder and truncation circuit included in the processor circuit, the first value and the first intermediate value to generate a second intermediate value;

truncating, by the adder and truncation circuit, the second intermediate value to generate an initial approximation of the iterative arithmetic operation; and performing, by the processor circuit, the iterative arithmetic operation using the initial approximation and the input operand.

7. The method of claim 6, further comprising determining the first value and the second value includes determining a plurality of segments over a predetermined interval.

8. The method of claim 7, further evaluating an error function dependent upon at least one lookup value associated with a given segment of the plurality of segments.

9. The method of claim 8, modifying at least one segment of the plurality of segments in response to determining a value of the error function is outside a predetermined error range.

10. An apparatus, comprising:
a memory circuit;
a processor circuit coupled to the memory circuit and configured to perform an iterative arithmetic operation based on an input operand and an initial approximation of a result of the iterative arithmetic operation, wherein the input operand is expressed in a binary representation that includes a fractional part having non-overlapping first, second, and third portions, and wherein the processor circuit includes:
a first lookup table including a first plurality of values that includes a particular value indicative of a first portion of an initial estimate of the result of the iterative arithmetic operation;
a second lookup table including a second plurality of values that includes a different value indicative of a second portion of the initial estimate of the result of the iterative arithmetic operation;
a control circuit configured to:
retrieve a first value from the first lookup table using the first and second portions of the input operand;
retrieve a second value from the second lookup table using the second portion, but not the first and third portions;
a multiplier circuit configured to generate a product of the second value and the third portion of the input operand; and
an adder and truncation circuit configured to:
generate a sum of the first value and the product; and
truncate the sum to generate the initial approximation.

11. The apparatus of claim 10, wherein the iterative arithmetic operation includes division.

12. The apparatus of claim 10, wherein the iterative arithmetic operation includes square root.

13. The apparatus of claim 10, wherein the fractional part of the input operand includes a concatenation of the first, second, and third portions.

* * * * *